(Model.)
R. W. IRWIN.
Axle Box.
No. 235,772.
Patented Dec. 21, 1880.
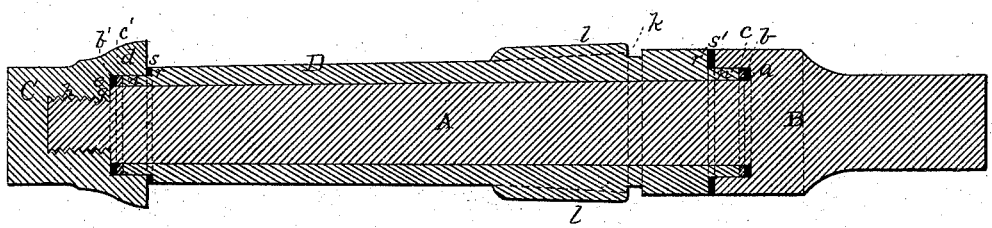
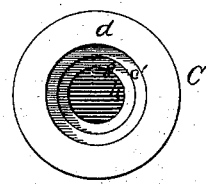
WITNESSES
John A. Ellis.
Philip C. Masi.
INVENTOR
R. W. Irwin
by J. C. Smith
ATTORNEY

UNITED STATES PATENT OFFICE.

ROBERT W. IRWIN, OF ST. FRANCISVILLE, ILLINOIS, ASSIGNOR OF ONE-HALF TO AUGUSTUS T. LOVELLETH, OF SAME PLACE.

AXLE-BOX.

SPECIFICATION forming part of Letters Patent No. 235,772, dated December 21, 1880.

Application filed October 16, 1880. (Model.)

*To all whom it may concern:*

Be it known that I, ROBERT W. IRWIN, a citizen of the United States, resident at St. Francisville, in the county of Lawrence and State of Illinois, have invented certain new and useful Improvements in Axle Boxes and Spindles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 represents a central longitudinal section of this invention, and Fig. 2 an end view of the nut.

This invention has relation to axle boxes and spindles; and it consists in the combination of the circular oil-recess in the enlarged shoulder of the spindle, the rubber packing therein, the metallic guard over the rubber, the recessed nut, also provided with rubber packing and metal guard, and the box having a reduced portion or lip at each end to enter the recesses of the axle shoulder and nut, and bearing-shoulders carrying leather washers to close the joints between the axle-shoulder, the nut, and the ends of the box, all as hereinafter shown and described.

In the accompanying drawings, the letter A designates the spindle, and B the shoulder back of the same, circularly recessed around the root of the spindle, as shown at $a$, to form an oil-recess, in which is placed a circular rubber packing, $b$, and over that a metallic bearing-washer, $c$. The end of the spindle is threaded, as usual, to receive the nut C, which is provided with an enlarged flange, $d$, and circular recess $e$ therein, whereby an annular interior shoulder, $g$, is formed around the threaded hole $h$. Upon this shoulder is placed a rubber packing-ring, $b'$, and a metallic washer, $c'$, as in the recess of the axle-shoulder.

D represents the box, usually formed with an annular groove, $k$, back of the flanges $l$, to hold it to the hub, and with reduced portions or lips $n$ and $n'$, extending from its outer and inner ends back to exterior bearing-shoulders, $r$ and $r'$, upon which are placed leather washers $s$ and $s'$, respectively. When the box is placed on the spindle the circular lip $n'$ enters the recess $a$ and bears against the metallic washer therein, the leather washer $s'$ serving to close the joint between the box and spindle-shoulder and prevent the entrance of sand or grit. In a similar manner the outer lip, $n$, of the box enters the recess $e$ of the nut, and bears against the metallic washer on the shoulder thereof, the leather washer $s$ on the outer shoulder of the box serving to guard the joint, an effect which is aided materially by extending the nut and shoulder of the axle over the lips of the box and guarding the ends of these lips by the metallic washers and packings at the bottoms of the recesses.

The washer $c'$ of the nut is designed to fit the wall of the recess closely, so as to hold the packing in place, and the interior diameter of both washer and packing is sufficient to admit th eend of the spindle, the lip $n$ of the box being made short to allow for said washer and packing, as shown in the drawings.

I am aware that it has been proposed to make axle-boxes having their inner ends entering recesses in the collars of the axles, and also to make a metallic washer with springs attached thereto, and to place it with a rubber one; also, that an English patent shows a box having flanges at its ends. Such devices I lay no claim to.

Having described this invention, what I claim, and desire to secure by Letters Patent, is—

The combination, with the spindle A and its circularly-recessed shoulder B, and the nut C, having the enlarged and recessed flange $d$ and interior shoulder, $g$, of the box D, having the inner and outer lips, $n$ $n'$, and shoulders $r$ $r'$, the leather washers $s$ $s'$ on said shoulders, and the packings $b$ $b'$ and metallic bearings $c$ $c'$ at the ends of the lips in the recesses of the axle shoulder and nut, as specified.

In testimony whereof I affix my signature in presence of witnesses.

ROBERT W. IRWIN.

Witnesses:
WM. C. NIBLACK,
ED. W. COOPER,
WILLIAM C. JOHNSON.